United States Patent [19]

Vuyk

[11] Patent Number: 5,766,013
[45] Date of Patent: Jun. 16, 1998

[54] BRAILLE CELL PROVIDED WITH AN ACTUATOR COMPRISING A MECHANICALLY RESPONDING, INTRINSIC CONDUCTING POLYMER

[75] Inventor: Klaas Robbert Vuyk, Brielle, Netherlands

[73] Assignee: F.J. Tieman B.V., Rockanje, Netherlands

[21] Appl. No.: 624,896

[22] Filed: Mar. 27, 1996

[30] Foreign Application Priority Data

Mar. 28, 1995 [NL] Netherlands .......................... 9500589

[51] Int. Cl.[6] .................................................. G09B 21/00
[52] U.S. Cl. ................................... 434/114; 340/407.1
[58] Field of Search .............................. 434/114, 113, 434/112; 340/407.1

[56] References Cited

U.S. PATENT DOCUMENTS 4,758,165  7/1988  Tieman et al. .
4,935,164  6/1990  Wessling et al. .
4,943,497  7/1990  Oishi et al. .
4,989,958  2/1991  Hamada et al. .
5,028,354  7/1991  Smith et al. .

OTHER PUBLICATIONS

A.C.R. Hogervorst en R.H.M. van de Lour, "Intrinsiek geleidende polymeren nu beter verwerkbaar", pp. 33–35, TNO–Industrie, Dec. 1991.
IBM Technical Disclosure Bulletin, vol. 36, No. 05, May 1993, Thermal Braille Transducer, p. 3.
Patent Abstracts of Japan, JP1167254, Jun. 30, 1989, Toshiyuki.
Patent Abstracts of Japan, JP61211963, Sep. 20, 1986, Koji.

*Primary Examiner*—Jeffrey A. Smith
*Attorney, Agent, or Firm*—Larson & Taylor

[57] ABSTRACT

A braille cell with an actuator responds mechanically on the application of an electrical current. The cell includes an intrinsic conducting polymer, the polymer being in contact with an ion supplying compound. The polymer and the ion supplying compound may abut against each other in layers and may undergo jointly a shape and/or volume change.

12 Claims, 1 Drawing Sheet

BRAILLE CELL PROVIDED WITH AN ACTUATOR COMPRISING A MECHANICALLY RESPONDING, INTRINSIC CONDUCTING POLYMER

FIELD OF THE INVENTION

The invention relates to a braille cell provided with a number of tactile members. Each tactile member can take two positions: (a) a first position, the rest position, in which the tactile member is retracted and (b) not palpable, and a second position, in which the tactile member is palpable. An actuator for each tactile member to move it from the first position to the second position and back, the actuator being movable by means of electrical voltages between a position corresponding with the first position of the associated tactile member and a position corresponding with the second position of said tactile member.

BACKGROUND OF THE INVENTION

Such a braille cell is known from the European patent EP-B0.237.090. This known cell has proven to be a success in practice, is well functioning and has a considerably long life.

However in a number of aspects some improvements are desirable.

In the known cell use is made of piezo-electrical bending members, which need a considerably high voltage in the order of hundreds of volts, to give a sufficient amount of travel. This causes a potential danger, which demands appropriate safety measures. Furthermore the high voltage requires specific electronics for the voltage supply to the piezo-electrical bending members.

Additionally the piezo-electrical bending members are quite expensive and determine about half of the price of a total cell. Besides that, after a final inspection and possibly an artificial aging, sometimes an adjustment by hand of the individual bending members is needed which is time consuming and raises the costs. A precise adjustment is necessary because it has to be ensured with great reliability that each palpable member is retracted in the rest position and exerts a rather large minimum force against depressing in the second position. This can be realized with the available piezo-electrical bending members by acceptable dimensions of the bending members, but only with a small excess of force and travel. This implies that a rest position with too large an amount of travel in the direction of the rest position will result in a force too small against depression in the second position, while too small an amount of travel in the direction of the rest position will very soon be experienced by the user as disturbing.

Finally it is desirable to obtain a reading line as long as possible with a small width.

SUMMARY OF THE INVENTION

The invention aims to overcome the above disadvantages, that is at least part of them, and to provide a braille cell which can be operated with considerably lower voltages (in the order of one or several Volts), which can be manufactured with lower costs and which uses cheaper bending elements.

These aims are realized in the invention by providing that the actuator comprises a first body of an intrinsic conducting polymer and a second. The second body is being able to give off and absorb ions and is in contact with the first body such that ion exchange between the first and the second body is permitted. The invention also has voltage connectors in contact with the first and second body.

Intrinsic conducting polymers are described in TNO-Industrie Toegepaste Wetenschap, December 1991, p 27–35. Many of these polymers already exists, and they all show a conductivity which can equal that of metals and can be compared with that of semi-conductors concerning doping mechanism. This publication and the intrinsic conducting polymers mentioned therein are to be considered as forming part of this description.

When the doping ions from a body giving off and absorbing ions are going into or are leaving the intrinsic conducting layer as a result of an applied voltage, the polymer undergoes a change in volume which can be considerably over 10%.

More in particular, the conductivity of intrinsic conducting polymers is brought on by taking oxidation electrons from the polymer chains so that positive charge-carriers in the polymer chains come about. As a result of which these chains become conductive, but it is also possible that charge-carriers jump from one chain to another. Furthermore the oxidation electrons form negative ions which remain between the chains. When the intrinsic conducting polymer is in contact with a material which is able to give off negative ions, the polymer will absorb the negative ions if a suitable voltage is applied. Because the concentration of negative ions is by several orders of magnitude larger than that of doping atoms in semi-conductors, the polymer will expand.

In U.S. Pat. No. 4,989,958 of Hamada et al a lens is described, consisting of two layers of intrinsic conducting polymers (poly-acrylic amide) with different percentages of acrylic acid groups. The tub layers are in a gel state and on applying an electrical field in a fluid (a mixture of water and acetone) expand or contract in different amounts, by means of which the whole deforms to a spherical form. Such a system with a two-part body of an intrinsic conducting gel submerged in a fluid is not suitable for application in a braille cell and it probably also will not be possible to make it suitable for that purpose in an economically justifiable way.

In U.S. Pat. No. 4,935,164 a number of intrinsic conducting polymers are mentioned and it is specially pointed at that in case of difficult mechanical machinability or infusibility a solution may be found in incorporating intrinsic conducting polymers in a thermoplastic material. Mechanical changes of shape of the intrinsic conducting polymers derived in this manner is not described or suggested in any way, and even less the possibility of applying these in braille cells. As a matter of course such composite intrinsic conducting polymers (incorporated in thermoplastic materials) are within the scope of the invention.

According to a first further elaboration of the invention the second body is fluid. This as such is known from U.S. Pat. No. 4,989,958, but with the application in braille cells a much smaller construction will be necessary, for example by fitting the body of expanding and contracting intrinsic conducting polymer in a cell at the bottom side of the ion supplying fluid.

According to a further embodiment of the invention it can be provided that the first body is enclosed round about. Herewith the lateral expansion of the intrinsic conducting polymer is countered or prevented and consequently the expansion in the free direction is increased. After removal of the applied voltage the pressure on the side walls will fall off and the expanded body will retract to the original position.

The above embodiments of the invention can operate in a number steps, with a first expanding body lifting a second body and so on, which however leads to a rather complicated construction that in general will not be preferred.

The displacement of the palpable member, usually a pin, must be 0.5–0.8 mm and preferably 0.8 mm, in order for the cell to be well palpable. With a linear expansion of for example, 10% this means that the height of the body has to be 8 mm. Usually a greater travel has to be set, which is limited by a mechanical boundary, so as to get a greater resistance against depressing at the end of the travel. This would require a height of at least 10 mm and probably even 12 mm. This again would mean that the ion conductivity in the intrinsic conducting polymer has to be sufficiently fast. Even for fast readers, more than 0.1 second is available to set a line with braille cells after reading the last line, which usually will be sufficient. The possibility exists, however, to quickly reset fast reacting intrinsic conducting polymers, whenever this would be too slow, by applying a short counter directed voltage pulse.

Another embodiment of the invention provides that the first and second body each have the shape of a sheet, and that the sheets abut against each other in ion exchangeable contact and are provided with an electrical conductor at the side of the sheet directed away from the other sheet.

A first further elaboration thereof provides that a combination sheet, comprising both sheets and electrical conductors, is stacked zigzag. Herewith the ions only have to travel a small distance of maximum the thickness of the double layer. Further it has the advantage that the voltage supply can be mounted at one side, with the electrodes close to each other.

A second embodiment may provide that a sheet shaped combination sheet, comprising both sheets and electrical conductors, is rolled up. When such a roll of a double layer of an intrinsic conducting polymer receives a voltage, as a result of which the volume increases, the roll for the remainder being retained at its cylinder surface, a relatively large expansion in axial direction will occur. Preferably this expansion is taken by resilient deformation, because with displacement of the successive layers of the roll it has to be feared that the roll will not totally retract to the starting position after termination of the electrical excitation.

According to still another embodiment of the invention it may be provided that the electrical conductors comprise an intrinsic conducting polymer.

The invention also comprises an actuator, which transforms an electrical tension in a mechanical movement.

The voltages, necessary to have the intrinsic conducting polymer respond, are of the same order of magnitude as the voltage required for electronic logical circuitry, which gives the important advantage that the usually high voltages of the braille cells of today no longer have to be generated and used.

BRIEF DESCRIPTION OF THE DRAWINGS

The invention is elucidated in the following on hand of the drawing, in which.

DESCRIPTION OF THE PREFERRED EMBODIMENTS

Figure 1:
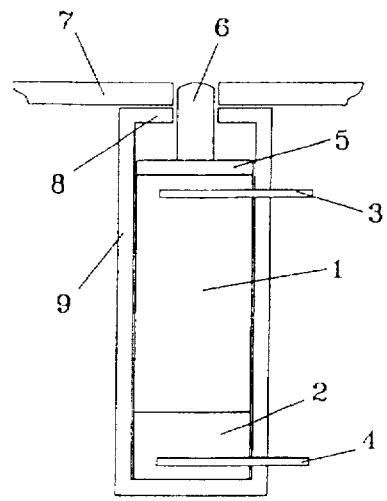
FIG. 1 schematically shows a section of a first embodiment of the invention.

In FIG. 1 a cylindrical piece of intrinsic conducting polymer is indicated with 1. A gel, able to give off ions, which also may be a fluid, is indicated with 2. Through electrodes 3,4 a rectified voltage can be applied to the combined body 1,2. When the body expands it will lift pin 6 through disc 5, so that the pin protrudes above the palping plate 7. With the upward movement disc 5 will abut against the inward directed stop 8 of an external housing 9. As a result of which the force, needed to depress the pin 6, is considerably increased. When the voltage over the electrodes 3,4 is removed, pin 6 will return to its starting position. To enhance this process a spring member or a similar device may be provided, or protruding part 8 may be resilient. Another possibility is to apply a short counter directed voltage pulse.

Figure 2:
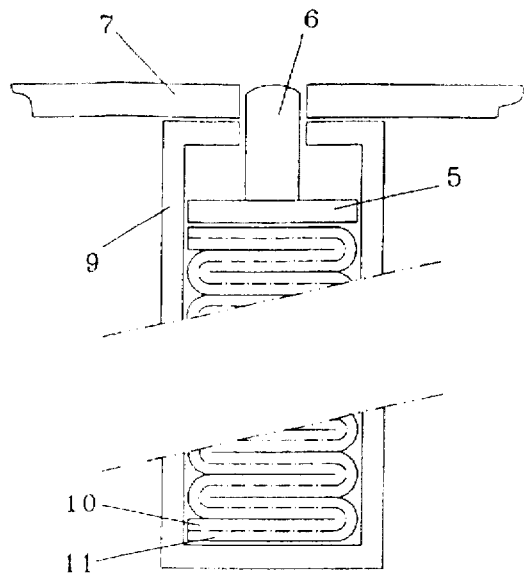
FIG. 2 shows the actuator part of a second embodiment.

FIG. 2 shows an embodiment in which a double sheet of an intrinsic conducting polymer 10 (indicated with a dotted line) and a layer 11, able to give off ions, are indicated. In the zigzag-stacking layers of the intrinsic conducting polymer 10 or layers of the material 11 able to give off ions always rest on material of the same type, so that an insulating layer is not needed. When both layers are sufficiently conductive, also no conducting layer is needed for the voltage supply.

Figure 3:
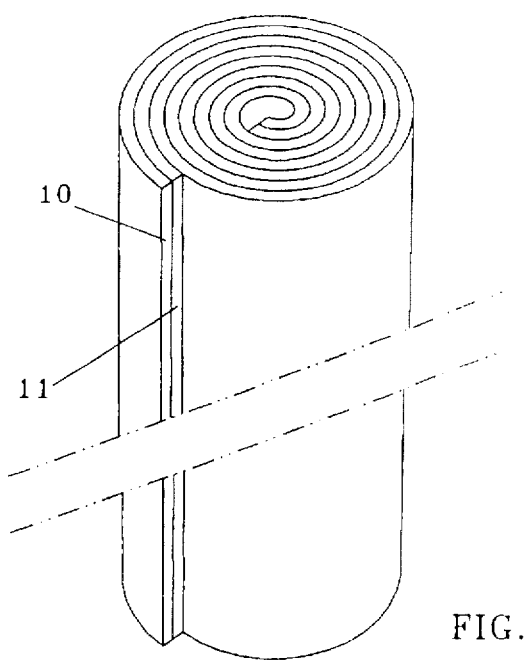
FIG. 3 shows a section of a further embodiment of the actuator part.

FIG. 3 again shows layers 10 and 11 in a rolled up shape of intrinsic conducting polymer and its ion provider.

Figure 4:
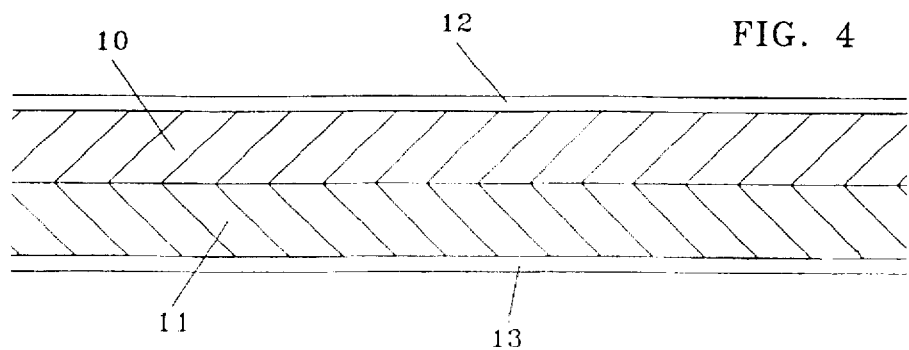
FIG. 4 shows a section of a sheet shaped actuator part on an enlarged scale, and FIG. 5 a section through a further embodiment.

FIG. 4 shows a section through a double layer according to the invention. The layers 10 and 11 are the same as in FIG. 2 and 3. At the upper side a layer 12 is provided which serves as electrical conductor, in case layer 11 is insufficiently conductive.

Layer 13 can be an insulating layer or also a conducting layer functioning as an electrode. Layers 10–13 can be of a polymer body which is doped in different degrees, and the layers 12 and 13 may be applied to or formed on the already doped layers with any available technique.

Figure 5:
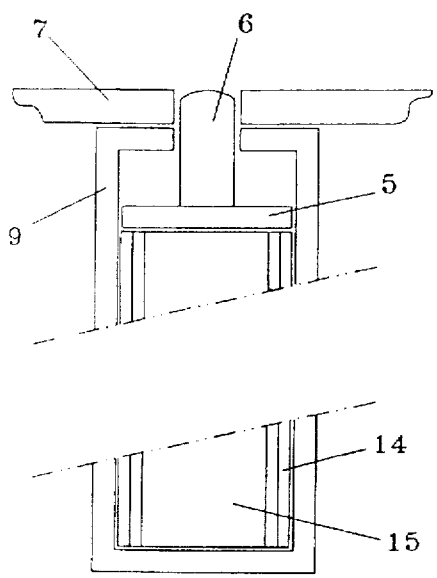

Finally in FIG. 5 an embodiment is shown with a housing 9 in which a thin double layered cylinder 14 surrounds a compound 15 which is able to give off ions. When a voltage is applied between the outside of the cylinder and the inside thereof or the fluid, able to give off ions, the cylinder 14 will expand, as a result of which cylinder 14 together with fluid 15 will push disc 5 upward.

I claim:

1. A braille cell comprising:
    a housing;
    a tactile member in said housing having a proximal end and a distal end, said tactile member being movable between (a) a rest position at which said tactile member is retracted in said housing and said proximal end does not extend out of said housing and hence is not palpable and (b) a reading position at which said proximal end extends out of said housing and palpable; and
    an actuator for said tactile member in said housing which is integrally connected to said distal end of said tactile member to move said tactile member between the rest and reading positions, said actuator being actuated by an electrical voltage and including
        a first body of an intrinsic conducting polymer which expands upon absorption of ions,
        a second body which is in contact with said first body and which is able to give off and absorb ions such that ion exchange between said first and second bodies is permitted, and
        a first voltage connector and a second voltage connector respectively connected to said first body and said second body by which an electrical voltage is selectively applied between said first and second bodies to selectively cause said first body to absorb ions from said second body and hence to cause said first body to expand and said tactile member to move to the reading position.

2. A braille cell as claimed in claim 1 wherein said first body is a liquid.

3. A braille cell as claimed in claim 1 wherein said first body is enclosed round about by said housing in a direction perpendicular to an axis extending between said proximal and distal ends of said tactile member.

4. A braille cell as claimed in claim 1 wherein said first and second bodies are respective first and second sheets having inner and outer faces, said first and second sheets having the inner faces in abutting ion exchangeable contact; and wherein said first and second sheets have a respective electrical conductor on the respective outer faces.

5. A braille cell as claimed in claim 4 wherein said first and second sheets are stacked in a zigzag pattern in said housing.

6. A braille cell as claimed in claim 4 wherein said first and second sheets are rolled up together in said housing.

7. A braille cell as claimed in claim 4 wherein the respective electrical conductors of said first and second sheets are each an intrinsic conducting polymer.

8. An actuator which responds in a mechanical manner to applied voltages comprising:

an intrinsic conducting, mechanically responding polymer sheet which expands upon absorption of ions, and a body sheet which is in contact with said polymer sheet and which is able to give off and absorb ions such that ion exchange between said polymer sheet and said body sheet is permitted; and wherein said polymer sheet and said body sheet are formed into a voltage-reactive part shaped into a number of layers.

9. An actuator as claimed in claim 8 and further including:

an enclosure for said voltage-reactive part, said enclosure being open only at one side; and a mechanical output member located at said one side of said enclosure which is moved when voltages are applied to said voltage-reactive part.

10. An actuator as claimed in claim 8 wherein said voltage-reactive part is stacked in the number of layers.

11. An actuator as claimed in claim 8 wherein said voltage-reactive part is wound in the number of layers.

12. An actuator which responds in a mechanical manner to applied voltages comprising:

an intrinsic conducting, mechanically responding polymer sheet which expands upon absorption of ions, and a body sheet which is in contact with said polymer sheet and which is able to give off and absorb ions such that ion exchange between said polymer sheet and said body sheet is permitted; and wherein said polymer sheet and said body sheet are formed into a voltage-reactive part which is cylindrical and capable of expanding under an applied voltage.

* * * * *